June 13, 1944.　　　　B. J. CRAIG　　　　2,350,989
TRANSMISSION
Filed May 29, 1940　　　2 Sheets-Sheet 1
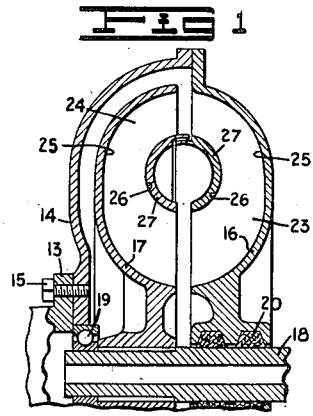
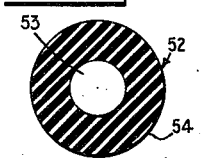
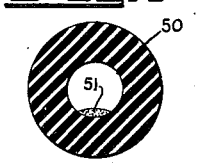
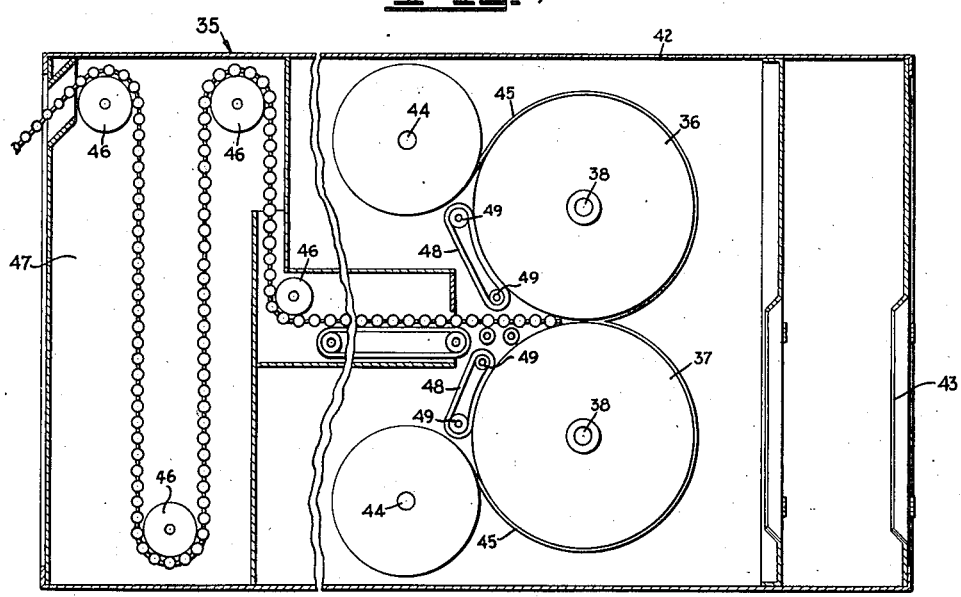
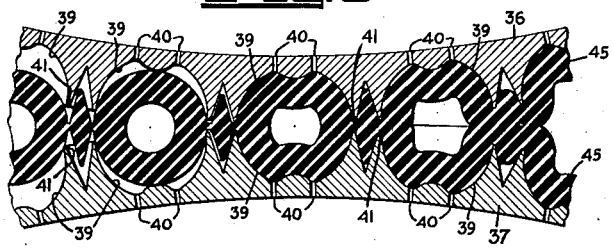
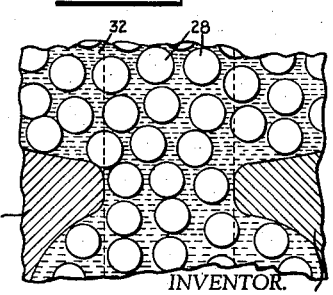
INVENTOR.
B. J. Craig June 13, 1944.  B. J. CRAIG  2,350,989
TRANSMISSION
Filed May 29, 1940  2 Sheets-Sheet 2
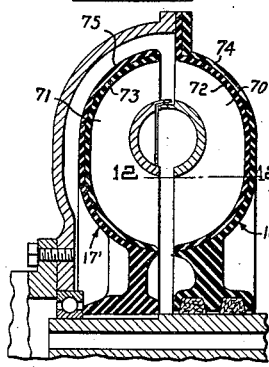
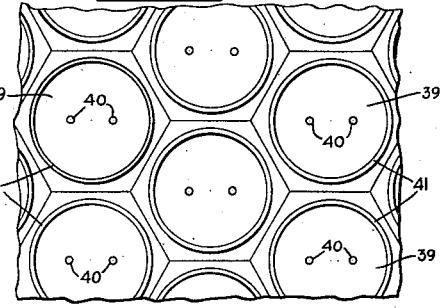
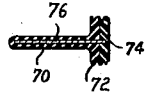
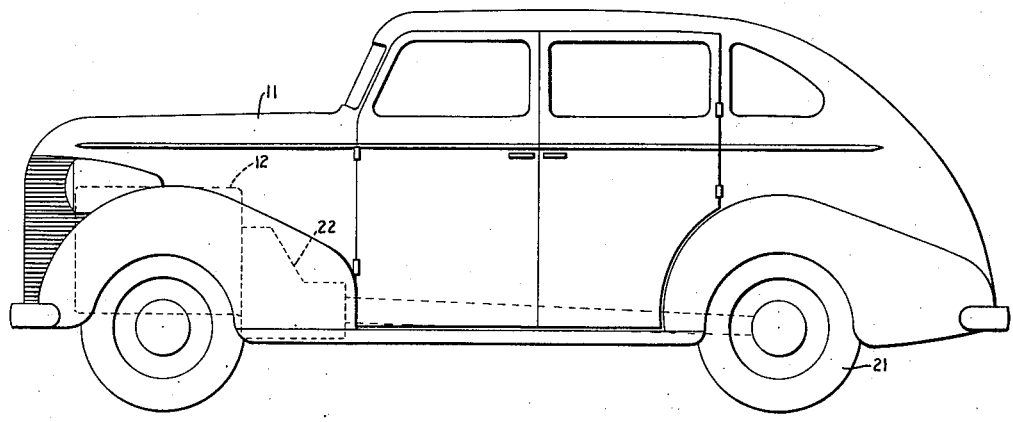
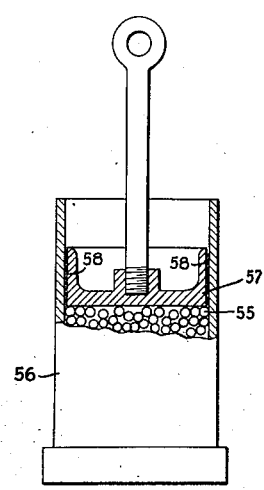
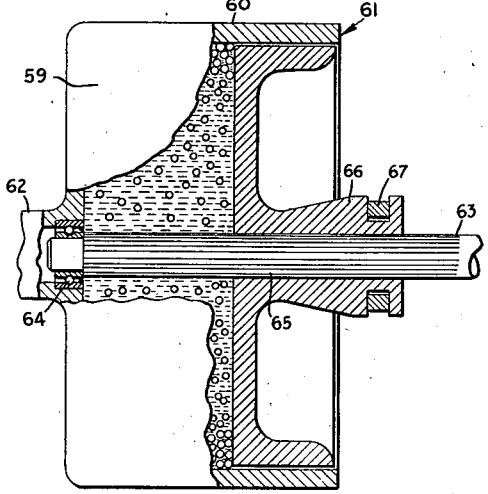
INVENTOR.
B. J. Craig Patented June 13, 1944

2,350,989

UNITED STATES PATENT OFFICE 2,350,989

TRANSMISSION

Burnie J. Craig, Los Angeles County, Calif.

Application May 29, 1940, Serial No. 337,890

2 Claims. (Cl. 60—54)

This invention relates particularly to fluid-turbo devices wherein a circuit for the working medium is defined by a primary driving member and a secondary driven member each of which may include a grooved and/or vaned member forming at least a portion of the boundary of the circuit. It will be understood, however, that the invention, in whole or in part may also be employed in connection with hydraulic converters or in other devices wherein liquid-like means serves to transmit motion and-or cushion movement, etc. between two relatively movable members. The present invention is described herein as embodied in a fluid coupling which is operated with the medium remaining at all times in the circuit although the invention may be used with constructions wherein the medium is pumped or otherwise placed into or out of driving position e. g. where it is run into a reservoir.

The invention as herein described is especially adapted for use in motor vehicles and similar constructions wherein the power of a prime mover is transmitted through a fluid coupling to vehicle propelling means.

Prime movers of the type mentioned are usually multiple cylinder engines in which the pistons are reciprocated by ignition of fuel and the vehicle has been propelled through the action of transmission gearing which provides, due to engine impulses, a periodically variable torque, so that the smooth forward motion present when a vehicle is propelled by steam or electric motive power is not secured and many efforts have been made to smooth out the impulse-by-impulse motion as, for example, by providing for a limited resiliently cushioned movement of the engine, etc.

Some recent automotive vehicles have included a fluid-turbo device in the nature of a fluid coupling in which a liquid such as oil working in a toroidal path passes from one vaned element to another to effect a coupling action. The liquid in normal low slip driving moves in a path about the axis of the elements. The liquid also moves in its circuit in planes intersecting the element axis.

The liquid entering the vanes of the primary at their inner periphery follows the contoured path to the outer edge whence it passes to the secondary and in thus moving outwardly the velocity is increased and, although the cross sectional area of the circulating liquid column may not vary, the cross sectional shape of the liquid column is rapidly changed and as the liquid moves inwardly in the secondary the velocity is reduced and the cross sectional shape is again changed. The shape of the liquid column is thus in a continual state of change being subject to what might be termed a kind of "kneading" action, or motion, in addition to the movements mentioned in the preceding paragraph.

Further, the outer periphery of the path of the liquid being defined by the walls of the elements, particles of liquid next to the confining walls do not change their distance from the wall but do change their angular speed in the planes intersecting the element axis. The particles of liquid most remote from the confining wall alternately increase and decrease their angular speed in the circuit. The particles of liquid intermediate the inner and outer periphery of the toroidal circuit also partake of the same changes of angular speed according to their position.

It thus appears that the particles of liquid in the circuit (except possibly those in the outer periphery) have continuous change in velocity while the "kneading" action and the rotation and the planar circuit movement mentioned in the preceding paragraphs is taking place.

In order that fluid turbo devices may transmit power efficiently the circuit defining walls are so shaped that the movement of the medium is normally not subject to abrupt path changes.

With such careful design, however, in operation when the relative speed of the elements is rapidly varied as when starting a vehicle on a hill when the engine speed is relatively low and the slip high, the torque transmitted may suddenly rise and surges occur. The surges apparently result from circulation irregularities or circulation break-down and re-establishment which break-down and re-establishment may occur quickly and sometimes frequently, resulting in an unsatisfactory driving effect. The surges tend to overload the engine if the inertia of the driven equipment is high. The added force resulting from the surges is thrown into the working parts so that added strength is required thus necessitating the use of members of increased strength and weight which under normal operation is unnecessary.

Also wide changes in transmitted torque result from instability of the circulating medium in maintaining its path in the primary and secondary elements due to the complicated path movement of the particles as heretofore mentioned and thus irregular driving results from the resultant circulation disturbances.

Under steady operating conditions with low slip and uniform flow the disturbance where the flow crosses over from one element to the other is not serious since the vanes are usually made of thin sheet metal, but there is, however, a slight disturbance since the liquid on striking the edges of the vane members is subject to a slight eddy or similar action and efficiency loss probably results even under ideal conditions with the old practice.

The unsatisfactory results mentioned have been due, in part at least, to the fact that the coupling liquid when functioning in undisturbed circuit flow provides a relatively rigid and non-compressible fluid column. As a result practically all of the motor impulses have been transmitted to the driven member. Further conditions which tend to disturb the uniform liquid flow, such as changes in speed of the input shaft, change in torque of load shaft, etc. result in circuit disturbance. This appears to be due to the fact that the changes must be taken care of largely by a change in the flow path, which flow path change may be so extreme as to cause surges or circulation collapse and re-establishment.

Thus, under ideal conditions, fluid-turbo drives have not produced an entirely smooth drive and under other conditions more or less objectionable driving has resulted. However, notwithstanding the objections and notwithstanding efficiency losses, particularly in converters, couplings and converters are finding wider use from time to time and the general object of the present invention is to provide a construction and a medium which removes or tends to reduce certain disadvantages in the old practice.

Seeking to overcome the objection noted the invention as disclosed herein contemplates the insertion into the driving connection between the engine and the driven wheels of a connection or coupling which has energy storing and releasing means.

Another object of the invention is to provide a fluid turbo device which includes a circuit path with a novel mobile mass therein which has such properties that its action results in a more uniform power flow.

Another object of the invention is to secure the mentioned and/or other advantageous results by providing a fluid turbo medium which has novel energy storing and releasing properties.

Another object of the invention is to provide a novel combination fluid turbo device and driving medium therefor.

A more specific object of the invention is to provide a fluid turbo device wherein a novel mobile mass in the circuit has such properties that it provides a smooth normal driving action tending to cushion engine impulses and which upon variation in the normal driving action tends to cushion and/or to restore the smooth flow and also tends to avoid surges and/or circulation collapse.

A further object of the invention is to provide a fluid-turbo device in which the driving medium is elastic and/or resilient and/or compressible and/or has energy storing and releasing properties so that it tends to maintain the proper driving relation and may at the same time act and react, and be acted upon while moving in its usual path so that circuit changes are to a certain extent damped out by action of the driving mobile mass and thus a more uniform power flow and a cushioned drive results.

Another object of the invention is to provide a fluid turbo device including novel wall portions and/or vane members.

Other objects and the advantages of this invention will be apparent from the following description taken in connection with the accompanying drawings, wherein:

Fig. 1 is a fragmentary sectional view through a fluid turbo device;

Fig. 2 is a central sectional view showing one of the fluid mass members;

Fig. 3 is a central sectional view showing another modified member before vulcanization;

Fig. 4 is a view similar to Fig. 3 showing the modified member after vulcanization;

Fig. 5 is a central sectional view showing a further modified member;

Fig. 6 is a fragmentary sectional view similar to Fig. 1 showing the fluid mass in the turbo device;

Fig. 7 is a sectional view, partly in elevation and partly diagrammatic, showing the apparatus for making the members;

Fig. 8 is an enlarged fragmentary sectional view showing the mold member;

Fig. 9 is an enlarged plan development of one of the mold members;

Fig. 10 is a side elevation showing an automotive vehicle with the invention applied thereto;

Fig. 11 is a view similar to Fig. 1 showing a modification;

Fig. 12 is a fragmentary sectional view taken on line 12—12, Fig. 11;

Fig. 13 is a central sectional view showing one form of the invention embodied in a cushion device; and Fig. 14 is a view similar to Fig. 11 showing one form of the invention embodied in a clutch device.

Referring to the drawings by reference characters the invention as disclosed is employed in a hydro-dyamic device which is shown as a coupling but it will be understood that this is by way of illustration only and that the invention may be employed with other fluid turbo devices such as converters or with other devices which transmit motion or cushion movement, etc. between two or more relatively movable members.

The device is shown as used with an automotive vehicle 11 having an engine 12 which may be a multi-cylindered gasoline engine which drives a flanged member 13 to which a rotatable housing 14 is connected by bolts 15.

The housing 14 includes a primary or turbo vane wheel member 16 and the housing is disposed about a secondary turbo vane wheel member 17 which mates with the turbo vane wheel member 16. The turbo vane wheel 17 is secured to a shaft 18 supported on a bearing 19 disposed in the housing 14. A suitable seal is maintained at 20.

The shaft 18 constitutes a load output shaft and is adapted to be connected to drive wheels 21 of the vehicle either directly, by gearing, or through a suitable change speed device 22. The illustrated construction of the vehicle is of the usual front engine-rear wheel drive type but the invention is applicable to other types of engine arrangement and drive.

The fluid turbo elements 16 and 17 include vanes 23 and 24, respectively, and their walls are contoured to form fluid receiving pockets 25 which are suitably spaced. The vanes 23 and 24 are notched as at 26 to receive semi-circular guide rings 27 which are suitably welded, or otherwise secured in place.

In operation power is transmitted from the driving shaft to the driven shaft by a flowing mass which forms a working circuit in the pockets 25 and which when the primary 16 is rotated passes between the vanes 23 thereof into the vanes 24 in the secondary to cause the latter to rotate. In prior constructions wherein oil or other non-yielding material was employed, the efficiency of operation depends upon the speed of rotation of the primary, the position of the primary relative to the secondary, the contoured shape of the pockets, the shape and distribution of the vane members, the relative speed of the primary and the secondary, the load torque relative to the input, etc. and there has been no provision made whereby the driving mobile connection could adapt itself to variations in the forementioned or other conditions so that a smoother driving action would result.

According to the present invention the fluid turbo device employs a coupling mass which in one disclosed form consists of a plurality of small members indicated at 28 and shown as spherical and having a cavity 29 filled with compressed air. The members 28 may be made of rubber, artificial rubber or other material having the requisite properties, and if desired the members may have particles 30 (Fig. 2) of metal or other material embedded therein to vary their specific gravity. The particles 30 preferably are removed somewhat from the surface 31 of the members 28.

The members 28 may be employed alone as a driving medium or they may be employed with a suitable liquid such as oil or other material which does not seriously affect the material of which the members are made. If a liquid is employed it is preferably used in such quantities as to at least fill the voids between the members 28 as shown at 32 in Fig. 6.

The amount of liquid and the size and weight of the members 28 may be varied to suit the particular requirements of the structure with which they are employed by controlling the size of the cavity 29, the wall thickness, and the use or absence of particles 30. The specific gravity of the members 28 may be made the same or greater or less than that of the liquid 32.

The properties of the medium are such that it responds quickly to changing conditions. Under normal driving the medium might be said to be tensed, at any one time, to correspond to the condition applied at that time and to be ready to respond to a further change should such occur.

For instance, if the applied torque suddenly increases, the medium will immediately store added energy so that less circulation disturbance will result. The stored energy will be later released in accordance with the driving conditions. This result is true, to a degree, regardless of whether the changes mentioned are large as during rapid acceleration with high slip or whether they are small as in normal periodically variable torque produced by a multi-cylinder gasoline engine.

In each condition of driving the medium automatically assumes a definite energy content for the imposed conditions and this energy content remains normal until the conditions which produce it change. This energy content may be considered as composed of the kinetic energy of the flowing material and the potential energy of compression of the particles.

On a departure from normal the mobile mass at once becomes an energy storing and releasing means which at once stores the energy above a normal and releases this stored energy under conditions below a normal. The storing and releasing of energy quickly balances whereupon the mobile mass operates under a new normal of contained energy content.

Regardless of the time required to store or release energy the tendency is to prevent or lessen the effect of abrupt torque increase or load input etc. and the medium is constantly taking the extremes of torque increase or load input and is reducing the effect of these extremes without loss of operating efficiency and while maintaining a normal balanced state between energy storing conditions and energy releasing conditions.

Thus by virtue of the properties of the mobile mass the periodic torque variations delivered by an internal combustion engine are largely damped out so that a smoother drive results. Further the turbulence and surging occurring under certain driving conditions with the previous fluid are largely eliminated.

In order to produce the members 28 a novel apparatus indicated at 35 in Fig. 7 may be employed. As shown the apparatus includes upper and lower drums 36 and 37 which are suitably supported for rotation. Each drum is hollow and mounted on a hollow shaft 38 which communicates with the interior of the drum and with the atmosphere.

As shown in Figs. 8 and 9 each of the drums is provided on its exposed surface with a plurality of substantially hemispherical mold cavities 39 which communicate through holes 40 with the interior of the drum. Each mold cavity 39 is surrounded by a more or less sharpened peripheral edge portion 41. The portions 41 on the two drums are in substantial engagement where the drums are tangent.

The apparatus 35 is preferably arranged in a room 42 where air under pressure is maintained. Access to the room 42 may be through a suitable airlock 43. The apparatus 35 includes supports 44 for rolls of rubber, plastic material, or other stock 45 and the construction is such that when the drums 36 and 37 are rotated the stock 45 is carried about the drums.

The drums being hollow and being bled through the hollow shafts, the interior of the drums is under less pressure than the exterior thereof so that the stock 45 being more or less plastic is forced by the compressed air into the mold cavities 39 and rotates with the drums until the edge portions 41 contact whereupon the two halves are squeezed together as shown in Fig. 8. The drums may be heated so that a slight cure results as the drums rotate. The stock with the minute hollow rubber members preferably united by fins pass from the drums and is carried on supporting devices 46 through a vulcanizer 47. The minute balls are preferably held in sheet form until vulcanization is complete whereupon they are separated in any desired manner as by multiple punches for instance.

The making of the balls having occurred in a room filled with compressed air the balls when finished are inflated by the contained air, the pressure of which has been predetermined.

In order to prevent excess leakage through the holes 40 which are not sealed by the sheet stock, endless elastic belt members 48 (see Fig. 7) may be employed. These members pass over rollers 49 and are dragged along by the adjacent drums so that the holes 40 beneath the belts 48 are closed thus reducing leakage.

In Figs. 3 and 4 another type of member is indicated at 50. This member may be made by taking a core 51 which may consist of some suitable member, such as amorphorus graphite combined with a gas releasing material such as ammonia powder and a binder such as clay to form a pellet. The core 51 is then covered with latex or similar material and vulcanized with the gas liberated from the ammonia powder serving to provide pressure for vulcanization and for inflation after the member is vulcanized. The member may be vulcanized in a chamber filled with compressed air which will prevent the gas liberated by the ammonia powder from expanding the latex cover unduly. The graphite and clay in the member 50 serve to add weight to the finished product.

In Fig. 5 the member 52 includes a ball 53 made of metal or other suitable material with a resilient and elastic covering 54 as of rubber vulcanized thereto.

The members 28 and 50 are compressible as well as resilient and elastic due to the contained gas. Rubber being relatively non-compressible the members 52 are resilient and elastic but are relatively non-compressible. When the members 28 and 50 are employed with a liquid or alone they form a liquid-like mass which is compressible, elastic and resilient.

The size of the members used in the fluid mass may be suitably varied to suit the conditions in each installation. The width of the space between the turbo elements may in a measure determine the size of the members, also the pressure within the contained members, their wall thickness, resiliency, elasticity, etc. will be suitably determined by the requirements.

The specific gravity of the members may be varied as required. For instance the members 28 when used with a liquid may have substantially the same specific gravity as that of the liquid. The members 50 preferably have a specific gravity less than that of the liquid while the members 52 preferably have a greater specific gravity than that of the liquid.

As an illustration of material employed the artificial rubber known as "Neoprene" may be employed and the liquid might well be S. A. E. No. 30 oil in which "Neoprene" swells but slightly and retains its tensile strength well although the type of material and oil may be varied as conditions require.

The medium is preferably of such a nature that it remains substantially uniform and stable under extremes of working conditions and the members should preferably be so made that they will not be unduly tensed under normal driving conditions so that they may store energy or release energy.

The members should preferably all be of the same size although in certain installations members of different sizes may be employed to better advantage.

The fluid mass instead of including individual members may include a mass of latex or similar material cured so that it maintains its mobility and flow characteristics and which has such resilient, elastic, or other properties that it responds in an improved manner in the circuit.

The fluid turbo elements 16 and 17 are preferably made of metal throughout while in the modified type shown in Figs. 11 and 12 the elements 16' and 17' which correspond to the elements 16 and 17 may be made entirely of artificial rubber, etc. as by molding. The members 16' and 17' in the contoured portions are disclosed as bodies 74 and 75 with the inner portions of the walls 72 and 73 thereof of such material and so cured that they have resilient properties so that in effect a resilient lining is provided for the contoured members.

The vanes 70 and 71 may also be made of resilient artificial rubber and if desired may be integral with the lining portion. The vanes may include reinforcing means 76 if desired.

The fluid masses previously described may be employed in the modified structure as the driving medium although the action of the resilient linings 72 and 73 and/or the action of the resilient vanes 74 and 75 causes the oil or other liquid heretofore used to operate in an improved manner.

In Fig. 13 the fluid mass of the present invention is indicated as at 55 as placed in a cylinder 56 such as a shock absorber cylinder in which a piston 57 reciprocates. In the disclosure the fluid mass 55 includes a liquid the quantity of which under atmospheric pressure is sufficient to at least fill the voids between the members constituting the mass. The skirt of the piston 57 is shown as relatively long and when pressure is applied to the piston the compressible, resilient mass 55 has its volume reduced and some of the liquid runs into the space 58 between the piston and the cylinder. As it does this some of the members of the mass 55 adjacent the lower surface of the piston crowd towards the space 58 and tend to seal this space thus reducing the need for an accurate fit between the piston and cylinder. When pressure is removed from the resilient liquid mass the liquid in the space 58 is forced inwardly by atmospheric air pressure.

In Fig. 14 the mass 59 is shown as confined in the cylindrical portion 60 of a clutch-like device 61 in which the member 60 is driven by a shaft 62, with 63 the driven shaft having a pilot bearing 64 and splined at 65 to a clutch member 66 which is in the nature of a piston sliding in the cylinder 60. The member 66 may be moved by a suitable clutch yoke 67 or in any other desired manner. In operation as the driven member rotates, centrifugal force causes the mass to be set in circulation and pressure of the mass 59 to be increased and as the mass becomes compacted a clutching effect occurs and when due to increased speed sufficient pressure has been applied to the contained fluid mass, the clutching effect will be completed. The fluid mass being compressible the clutch member 66 may be shifted to control the capacity of the clutch chamber to thereby control, in a degree, the clutching action.

Having thus described the invention I claim:

1. In a fluid transmission, a fluid turbo device having a primary member normally driven by an input shaft and a secondary member subject to the torque of a load shaft, the device including a working circuit which includes a liquid having therein hollow, discrete, non-coalescing, inflated, elastic members of a size to be freely movable in and with the liquid.

2. In a fluid transmission, a fluid turbo device having a primary member normally driven by an input shaft and a secondary member subject to the torque of a load shaft, the device including a working circuit which includes a liquid having therein hollow, discrete, non-coalescing, inflated, resilient members of a size to be freely movable in and with the liquid.

BURNIE J. CRAIG.